UNITED STATES PATENT OFFICE.

ULRICH FRIEDRICH BENKER, OF CLICHY, FRANCE.

MANUFACTURE OF SULFURIC ACID AND SODIUM SULFATE.

No. 899,284.

Specification of Letters Patent.

Patented Sept. 22, 1908.

Application filed March 4, 1907. Serial No. 360,460.

*To all whom it may concern:*

Be it known that I, ULRICH FRIEDRICH BENKER, a citizen of the Republic of Switzerland, residing at 129 Rue Martre, Clichy, Seine, in the Republic of France, chemist, have invented certain new and useful Improvements in the Manufacture of Sulfuric Acid and Sodium Sulfate, of which the following is a specification.

This invention has for its object a process of making sulfuric acid and neutral sulfate of soda.

It is known that the bi-sulfate of soda obtained in such large quantities in the manufacture of nitric acid is a product for which no rational use has hitherto been found.

In certain cases, bi-sulfate of soda is used for the preparation of neutral sulfate of soda by mixing it with sea salt, this mixture being heated in special furnaces whereby hydrochloric acid is obtained on the one hand and neutral sulfate on the other. This process can only be utilized when there is a use for the hydrochloric acid.

Another method consists in heating the bi-sulfate with carbon and in this case the sulfuric acid is converted into sulfurous acid, the value of which only represents a small part of that of the sulfuric acid from which it is obtained.

The attempts made to decompose the bi-sulfate by heat alone, have proved unsuccessful because it fuses under heat, and practically speaking, no apparatus will resist the action of fused bi-sulfate; again if the bi-sulfate be heated to a white-red, 8 to 10 % only of the sulfuric acid is liberated.

The inventor has found that by intimately mixing the bi-sulfate of soda with an appropriate quantity of silica (fine sand) or of finely pulverized silicates, or again, with any substance unattacked by the bi-sulfate, such as the anhydrous sulfates of soda, of potash, of lime, etc., in such a manner that the mixture does not fuse under the action of the heat, the whole of the sulfuric acid over the amount corresponding to the sulfuric acid of the neutral sulfate becomes liberated very readily at red heat.

The mixture of bi-sulfate and of the inert substance is heated to a red heat (500° to 600° C.). As the anhydrous sulfates of soda and potash only melt at a white heat (800° to 900° C.) they are not fused in the process. The inert substance has no chemical action on the bi-sulfate but absorbs it mechanically as fast as the bi-sulfate melts so that the mixture remains in a dry and sand-like condition. The proportions between the bi-sulfate of soda and the inert substances will vary according to the nature of these latter bodies.

When silica is employed, it is preferably taken in substantially equal proportions to the bi-sulfate. The sulfuric acid which is liberated may be collected in a concentrated state in appropriate apparatus.

I claim:

A process for making free sulfuric acid and neutral sulfate of soda by the decomposition of bi-sulfate of soda, consisting in heating a mixture of bi-sulfate of soda and of silica in substantially equal proportions, thus preventing the fusion of the bi-sulfate.

In testimony of which I have hereunto placed my hand.

ULRICH FRIEDRICH BENKER.

In the presence of—
HERNANDO DE SOTO,
ALBERT NUNES.